United States Patent Office 3,324,048
Patented June 6, 1967

3,324,048
METHODS OF MAKING CATALYSTS
Charles J. Plank, Woodbury, and Edward J. Rosinski, Almonesson, N.J., assignors to Mobil Oil Corporation, a corporation of New York
No Drawing. Filed May 4, 1964, Ser. No. 364,797
6 Claims. (Cl. 252—455)

The present invention relates to new catalysts derived from crystalline aluminosilicates, to methods of making such catalysts, and to the use of such catalysts.

Crystalline aluminosilicates comprise synthetic and natural materials of ordered internal structure having the following general formula:

$$M_n^2 \cdot XAlO_2 \cdot YSiO_2 \cdot ZH_2O$$

wherein $n$ is the valence of the metal M, Y/X is the atomic ratio of silicon to aluminum, and $ZH_2O$ is the water of hydration. These materials are porous, possessed of large surface per unit of weight, the internal passages and the ports thereto are of characteristic dimensions dependent upon the type of crystallinity, and the crystalline arrangement is not changed by dehydration and hydration.

Because of the specificity of port and passage size for a given crystalline arrangement, the dehydrated materials show a size selectivity for materials which may pass within the crystalline structure. A crystalline aluminosilicate having effective port sizes of a specific maximum dimension, say 5 A., will admit to its interior, for adsorption, conversion, etc., a molecule whose dimensions are not greater than 5 A., and will not accept molecules whose size or configuration is such as to have greater dimensions. For example, certain of these materials will adsorb straight chain paraffins while rejecting isoparaffins. Because of this, catalysts derived from crystalline aluminosilicates have been selected for specific reactions because of their port size, in that a reagent accepted by the catalyst might be converted, while larger molecules in the charge mix, not accepted by the catalyst, would not be converted. This characteristic has been referred to as size or shape selectivity.

Crystalline aluminosilicates have been used as catalysts, and as catalyst supports; for example, as supports for platinum.

Crystalline aluminosilicates which have been altered in certain respects by ion substitution have been found to provide a new family of catalysts of very surprising capabilities.

These new catalysts, spoken of hereinafter as superactive crystalline aluminosilicate catalysts, may be made by treating natural or synthetic crystalline aluminosilicates by several methods. For example, base exchange may be employed to replace the alkali metal of an alkali metal aluminosilicate with rare earth metals or other metal ions, or they may be base exchanged with ammonium compounds followed by heating to drive off $NH_3$ ions, leaving an "H form" or acid form of aluminosilicate, or by treatment with mineral acid. These treatments may be followed by activity adjusting treatments, such as steaming, calcining, dilution in a matrix and other means. Explanation of the methods of preparing such catalysts is made in copending application Ser. No. 208,512, filed July 9, 1962.

The crystalline aluminosilicate may be employed directly as a catalyst or it may be combined with a suitable support, binder, or matrix. Inorganic oxide or metal matrixes are preferred. The aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be base-exchanged to introduce selected metal ions into the aluminosilicat and then dried and calcined. Also, the aluminosilicate may be intimately composited with a suitable binder, such as inorganic oxide hydrogel or clay; for example, by ball milling or jet milling the two materials together over an extended period of time, under conditions to reduce the particle size of the aluminosilicate to a weight mean particle diameter of less than 40 microns and preferably less than 15 microns.

The relative proportions of finely divided crystalline aluminosilicate and inorganic oxide matrix may vary widely with the crystalline aluminosilicate content ranging from about 1 to about 90 percent by weight and more usually, where the composite is prepared in the form of beads, in the range of about 5 to about 50 percent by weight of the composite.

Unaltered crystalline aluminosilicates, or such material used as a support for a catalytic material such as platinum may also be composited with binders as above, and both these materials and the superactive materials may be used in mechanical admixture with other catalytic materials or inerts.

When presented in pellet or bead form, such materials should be of size appropriate for operation under the specific conditions existing. Thus, the catalyst may be in the form of a finely divided powder or may be in the form of particles of $\frac{1}{16}''$ to $\frac{1}{8}''$ size.

The superactive crystalline aluminosilicates spoken of above are characterized by comparative activities for the cracking of hexane, $\alpha$, (explained in application Ser. No. 208,512, filed July 9, 1962), substantially greater than 1.0 and, for such materials in the lower ranges of activity, of 1 upward, as measured by $\alpha$, capable of activities at least twice as great in the cracking of gas oil as a conventional amorphous silica-alumina catalyst of 46 AI, (as measured by the Cat-A test, "National Petroleum News" 36, Page R-537, Aug. 2, 1944), which conventional catalyst, in hexane cracking, is assigned as $\alpha$ of 1.0. This conventional catalyst, assigned an $\alpha$ of 1.0, will give 13% conversion of normal hexane, at 1000° F., using 1.5 cc. of catalyst, 30-60 mesh, with a gaseous flow rate of 10 cc./minute of helium saturated with N hexane vapors at room temperature and pressure, instantaneous conversion being measured at the fifth minute on stream.

Both the crystalline aluminosilicate and the superactive crystalline aluminosilicates may be handled in accordance with the present invention, which is based upon the discovery that there are methods whereby the effective port sizes of such materials may be altered in controlled fashion. By the methods herein disclosed, major adjustments may be made in the port size of such materials, it being understood that port size is merely another way of stating the sizes of molecules that may be accepted, or rejected, by the aluminosilicate.

The significance of this may be appreciated when it is realized that a crystalline aluminosilicate of 10 A. port size will accept almost any material present in a hydrocarbon cracking stock, while a material of 6 A. port size will accept paraffins, aromatic compounds of relatively small dimensions, and the like, and will exclude polycyclic compounds, multibranched aromatics and similar molecules of complicated configuration, and especially those compounds resembling porphyrin residues and carrying small amounts of vanadium, nickel, and the like. Now, if the crystalline aluminosilicate be one used for a hydrocarbon conversion process and possessed of activity dependent upon its internal condition, such as the superactive crystalline aluminosilicates above referred to, or upon a material impregnated within its structure, such as platinum for conversions involving hydrogen, the exclusion of unwanted molecules while permitting entry of molecules desired for conversion may be quite important. This is particularly true when it is realized that the more complicated molecules mentioned normally contribute little to a desired conversion other than coke formation and catalyst deactivation, and when it is noted that the porphyrin-like materials carrying traces of "poison" metals can be excluded to a large degree from the conversion area.

In this connection, it is well to note that the port size needn't be so small as to completely reject all coke precursors, metal-containing residues, and the like, even if this were possible. If the effective port size is small enough, near enough to the size of the unwanted molecular species, the rate of entry of that unwanted molecule will be much lower than that of smaller molecules, giving rise to a kinetic factor limiting entrance, conversion, deposition, etc., of the larger molecular species.

It is therefore an object of this invention to provide catalytic materials of specific aluminosilicate crystalline types having port sizes differing from those normally characterizing the particular crystalline type, at least those entrance channels (or ports) at the external surface of the crystallites.

A further object of the invention is to provide methods for altering the size of the ports of a crystalline aluminosilicate, at least at the external crystallite surface, and thereby to modify the catalytic activity of the aluminosilicate and to stabilize its activity.

Another object of the invention is to provide a method for modifying crystalline aluminosilicate cracking catalysts having reduced tendency to form coke. A related object is the provision of crystalline aluminosilicate cracking catalysts having a reduced coke forming tendency.

It is an additional object of this invention to provide a catalyst that will prevent coke precursors from reaching active catalyst sites thereby reducing coke formation during hydrocarbon conversions.

A particularly important object of this invention is to provide crystalline aluminosilicate catalytic materials having the stability normally associated with such materials having large port sizes combined with the size-shape selectivity normally associated with such materials of smaller port size which frequently have lesser stability.

Another particularly important object is the provision of crystalline aluminosilicate catalytic materials carrying impregnants and the like which can only be deposited within materials of large port size, coupled with a controlled small port size and the resultant size-shape selectivity normally asociated with materials into which such impregnants can be introduced only with difficulty or not at all.

As an example of the methods and reagents which may be used, we have carried out experiments with certain organo-silicates such as ethyl silicate $(Si(OC_2H_5)_4)$. These materials are soluble in alcohols and an aluminosilicate of larger port size may be treated with an alcoholic solution of the reagent. The following is believed to be the type of reaction occurring. Silicon or other atoms in the crystalline structure having a valence occupied by a hydroxyl group will engage in a reaction such as the following, assuming reaction with $\equiv SiOH$:

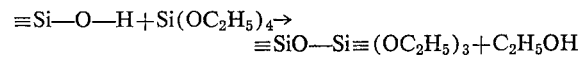

Upon heating, the attached ethyl silicate decomposes:

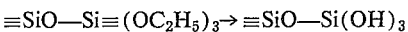

leaving, instead of the original silica, an additional silica complex. This treatment is most pronounced in its effect upon the most readily available $\equiv SiOH$, namely those near the surface of the crystalline structure and particularly those silica sites surrounding the ports or entry points into the crystal lattice. The deposite of such additional silica complex items at such points thus serves to narrow or partially close the port and hence gives control over the type of molecules which may be admitted to the catalytic surfaces in the interior chambers of the crystal lattice.

The extent of such alteration is dependent upon the amount of ethyl silicate available and the time for which it is available, that is, upon the concentration of the ethyl silicate reagent, and the duration of treatment.

As an example of such port size alteration, samples of a crystalline aluminosilicate of the X faujasite type were treated at about 160° F. for a period of 24 hours with alcoholic solutions of ethyl silicate having a concentration of about 20 wt. percent or greater. At the end of such treatment, the aluminosilicate was freed of the reagent, dried, and heated to a temperature of 1000° F. for a period of about 10 hours. Upon examination of the adsorption characteristics of the aluminosilicate products, they were found to have the characteristics of a structure having about 6°–8° A. ports, accepting paraffins and smaller cyclic compounds but rejecting more complicated hydrocarbons, rather than the broad acceptance of the original 10° A. X-faujasite material.

EXAMPLE I

Preparation

A soduim X-faujasite was exchanged, semi-continuously, with a solution containing 5% $RECl_3.6H_2O$ and 2% $NH_4Cl$ for a sufficient time to reduce the sodium content to 0.22%. In the exchange process, rare earths are introduced into the aluminosilicate to the extent of 26.9%, calculated at $RE_2O_3$. This material was washed free of chloride ion, dried for 20 hours at 230° F. and then calcined in air for ten hours at 1000° F. It was then exposed to the atmosphere and allowed to equilibrate with the moisture in the atmosphere, before portions thereof were treated wtih alcohol solutions of $(EtO)_4Si$ as described later. This exposure to moisture was found later to be unnecessary.

In preparing the specific items identified as 2, 3, and 4, twenty-four gram samples of the above REHX were treated with 100 cc. portions of alcoholic solutions containing 0, 23.9, 45.5 and 100 wt. percent ethyl ortho silicate respectively Treating conditions were 160–170° F. for 24 hours. After the excess solution was decanted, the catalyst dried in air at 230° F. for 20 hours, recalcined for ten hours at 1000° F. and then steam treated for 24 hours and 48 hours (successive tests) at 1200° F. and 15 p.s.i.g. in 100% steam. The physical and catalytic properties of the products are summarized in Table 1. Item 1, of course, represents a blank for the other three experiments.

TABLE 1.—SILICA MODIFICATION OF REHX

| | 1 | | 2 | | 3 | | 4 | |
|---|---|---|---|---|---|---|---|---|
| Steaming, PSR | 24 | 48 | 24 | 48 | 24 | 48 | 24 | 48 |
| Description | | | | | | | | |
| Starting Wt., g | Calcined REHX [1] 24 | | Calcined REHX [1] 24 | | Calcined REHX [1] 24 | | Calcined REHX [1] 24 | |
| Silicate Treat: | | | | | | | | |
| Solution | Formula 30 (alcohol) | | Formula 30+(EtO)$_4$Si 23.9% (EtO)$_4$Si | | Formula 30+(EtO)$_4$Si 45.5 wt. percent (EtO)$_4$Si | | Formula 30+(EtO)$_4$Si | |
| Conc., Wt. percent | 100 | | | | | | 100 | |
| Contacts | One contact at 160 to 170° F. for 24 hours using 100 cc. solution per 24 g. (38 cc.) catalyst. | | | | | | | |
| Silica added calculated from wt. gain, Wt. percent | | | 12.5 | | 17.8 | | 14.1 | |
| Physical Properties | (2) | (3) | (2) | (3) | (2) | (3) | (2) | (3) |
| Surface Area, m.$^2$/g., Steamed | | 311 | 287 | | 310 | 317 | | 331 | 223 | | |
| Adsorption: | | | | | | | | |
| Cyclohexane, wt. percent | 14.1 | 9.7 | | 12.5 | 9.5 | | 12.5 | 9.4 | | 9.3 | 7.4 | |
| N-hexane, wt. percent | | 7.2 | | | | 8.0 | | | 7.2 | | | 7.0 |
| X-ray Analysis: | | | | | | | | |
| Shift, percent | 55 | 0 | | 45 | 80 | | 40 | 70 | | 40 | 90 | |
| Crystallinity, percent | 100 | 53 | | 90 | 65 | | 85 | 65 | | 90 | 70 | |
| Catalytic Evaluation, PSR | 24 | 48 | 24 | 48 | 24 | 48 | 24 | 48 |
| Conditions: | | | | | | | | |
| LHSV | 16———————————————————————————————————→ | | | | | | | |
| c/o | 0.38——————————————————————————————————→ | | | | | | | |
| Conversion, Vol. percent | 62.1 | 60.0 | [4](18) | 12.3 | [4](20.1) | [4](14.6) | | |
| C$_5$+ Gasoline, Vol. percent | 51.3 | 50.1 | 6.4 | 7.8 | 7.3 | 9.7 | | |
| Total C$_4$'s, Vol. percent | 13.3 | 12.4 | | 3.2 | | | | |
| Dry Gas, Wt. percent | 6.0 | 5.9 | | 2.7 | | | | |
| Coke, Wt. percent | 2.5 | 2.1 | | 1.3 | | | | |
| H$_2$, Wt. percent | 0.04 | 0.03 | | 0.01 | | | | |
| Delta Advantage Over Si/Al: | | | | | | | | |
| C$_5$+ Gasoline, Vol. percent | +7.7 | +7.7 | | | | | | |
| Total C$_4$'s, Vol. percent | −3.7 | −3.8 | | | | | | |
| Dry Gas, Wt. percent | −2.0 | −1.8 | | | | | | |
| Coke, Wt. percent | −2.4 | −2.4 | | | | | | |
| Hexane Conversion after 5 min.,[5] 800° F | 15.1 | | 69.5 | | 68.7 | | 59.2 | |

[1] REHX prepared exchanging a sodium X with 5% RECl$_3$·6H$_2$O+2% NH$_4$Cl to 0.22 Na.
[2] Calcined 10 hrs. at 1,000° F. in air.
[3] Steamed PSR 24 (24 hrs. at 1,200° F. with 15 p.s.i.g. steam) PSR 48 hrs.
[4] Data not completed.
[5] Hexane cracking test involves passing n-hexane over a small sample of catalyst contained in a reactor and analyzing the products obtained by gas chromatography. The conditions of test were as follows: Catalyst volume in reactor, 1.5 cc.; n-hexane flow rate, 0.66 cc./hr. Liquid hourly space velocity, 0.44; catalyst to hexane ratio, 46; temperature, 800° F. The product was taken off after 5 min. on stream and passed into chromatograph for analysis.

*Results of catalytic and physical tests*

(1) The adsorption data show that ethyl silicate treatment does not seriously alter the adsorption properties of the REHX for small molecules such as n-hexane and cyclohexane. Nor does surface area change much.

(2) X-ray data show no great decrease in catalyst crystallinity. However, it does show an apparent line shift indicating interaction of the silica with the crystal structure.

(3) The hexane cracking data show that the silicate-treated catalysts are very substantially *more active* (after steaming) than the untreated blank.

(4) On the other hand, the gas oil cracking data show about 20% conversion at 16 LHSV compared to 60–62% conversion for the untreated catalyst. In view of the hexane data, we must conclude that the pretreatment with silica has restricted the port openings so that many of the larger molecules of the gas oil cannot enter to be cracked.

(5) From the hexane cracking results given in (3), it is clear that the silicate treatment has greatly stabilized the catalyst to steam deactivation so far as its ability to crack small molecules (hexane) is concerned. In addition, crystallinity after steaming is higher for the treated catalysts.

An important application of this principle is the following:

It is difficult to secure suitable impregnation with platinum on a crystalline aluminosilicate of the A type of 4–5 A. port and passage size and frequently the material so prepared is not stable to the conditions to be encountered in the contemplated hydrogenation-dehydrogenation reactions. However, it is frequently desirable to selectively operate upon the smaller molecules of a mixed charge stock while not acting upon the more complicated ones. This is obviously not possible with wide acceptance of crystalline aluminosilicates of large port size.

A catalyst desirable for such selective use may be had by starting with a faujasite material of X or of Y type, with large port size and a sufficiently high Si/Al atomic ratio to be highly stable under storage, transportation, conversion, and regeneration conditions (preferably with an Si/Al atomic ratio in excess of 1.1), and impregnate it with a suitable amount of platinum or other hydrogenation-dehydrogenation component in known manner and in known concentrations.

Then the faujasite-type material is treated as taught herein to reduce it to an effective passage size of about 6 A. The resulting catalytic material will then accept for a hydrogenation-dehydrogenation type of reaction only paraffins and smaller aromatic compounds, while excluding polycyclic compounds, multi-branched aromatics, porphyrins, and the like. Such a catalytic material may then be used, if desired, in physical admixture with superactive aluminosilicate compounds of high cracking ability for a process in which the more complicated molecules are cracked, while paraffins and less complicated molecules are subjected to a hydrogenation or dehydrogenation transformation.

Another utilization of this concept arises from adsorption uses. Aluminosilicate materials of high Si/Al ratio, for example of 2.0 and above, are particularly stable against heat, moisture, and the like. Such materials, such as the Y-type faujasites, are also of large port size. Consequently, a highly stable adsorbent, but one also capable of discriminatory adsorption, such as between paraffins and iso-paraffins, can be made by downwardly adjusting the port size of such materials to achieve the desired discriminatory adsorption characteristic dependent upon port size.

Another utilization of this concept arises as follows: It is frequently desirable, for various purposes, to oxidize a portion of a mixed stream of hydrocarbons. An example of this is the oxidizing of low molecular weight paraffinic molecules in the reaction area of a cracker to provide at least a portion of the endothermic heat of cracking. Since aluminosilicates are themselves fairly active oxidation catalysts, small port size aluminosilicates may be employed alone, in admixture with cracking catalysts of various sorts, for this purpose. Or, their activity may be enhanced by impregnation with known oxidation promoters, such as oxides of various metals. Once again, aluminosilicates of small port size are not particularly stable against the conditions to be encountered, and do not lend themselves readily to impregation and similar treatments. The methods above outlined may be used to provide a stable aluminosilicate material, with or without an impregnated oxidation promoter, for such use.

Similar control of port size may be accomplished by the use of essentially any reagent RX capable of reacting with protons within the aluminosilicate structure, including water of hydration of the cations, to yield a condensation product by splitting out of HX. Here, in RX, R is generally an inorganic group, either metal or non-metal, though for some purposes it could be organic. Also, in RX, X is a group such as a halide, alcoholate, or ester, capable of reacting with an —O—H group to yield a compound HX which is removed from the aluminosilicate under the conditions of treatment, usually by volatilization. Specific examples are the halides of Si, Ti, B, Al, P, Se, Te, Zn, Hf, V, Cr, Mo, W; Group 8 and Zn alcoholates; Group 3A, 4A, 5A, 6A esters (e.g. ethyl phosphates, borates, silicates, selenates); capable of dissolving in non-aqueous solvents, to be applied in reaction as indicated hereinbefore. Vaporizable reagents, such as AlCl$_3$, ethyl silicates, etc., may be applied in a vapor stream followed by appropriate after-treatment. Where the initial treatment is such as to leave chlorine or other strongly acidic ion, it may be necessary to hydrolyze and wash prior to heating. Since such an operation involves an exposure of the crystalline aluminosilicate to acidic conditions, and involves at least a partial ion exchange to the "H" or acid form of the aluminosilicates, it must be noted that only aluminosilicates of high Si/Al atomic ratio, preferably 2.0 and above, are structurally stable in the acid form and such operations should be restricted to these aluminosilicates. It is, of course, essential that application of such reagents as AlCl$_3$ and the like, in dissolved form for this purpose, be applied in the substantial absence of water in the solvent.

Other reagents MX, where M is a cation, such as NaH$_2$PO$^4$, certain ammonium compounds, and the like, acting to complex with a cation of the aluminosilicate, can perform similar functions.

The broad aspects of the application of such reagents can be stated as utilizing them in such concentrations, for such times, and in such amounts, as to provide the desired port closure. In detail, since the process may be used with a variety of reagents, with a variety of aluminosilicate materials, and for a variety of degrees of port closure for any combination of reagent and aluminosilicate material, it is not possible to provide any generalized procedural directions expressed in specific limitations.

The nature of the deposit and its distribution, with respect to the structure of the aluminosilicate, appears to have an influence upon the change effected. If a small amount of deposit be distributed with some uniformity in the structure, the effect noted herein is not as pronounced as if the deposit were mostly at the surface, or in such amount as to be both internally and superficially distributed. For example, about 5% (wt.) of silica (based upon dehydrated aluminosilicate), added in such a manner as to permit somewhat uniform distribution within the structure of the aluminosilicate, will not substantially change the capability to accept a size-spectrum of hydrocarbons suitable for cracking. It will increase the stability of the aluminosilicate to a notable extent. Similar phenomena occur with other reagents.

In summary, in accordance with this disclosure, there may be provided aluminosilicate materials, ion-exchanged aluminosilicate materials, acid form aluminosilicate materials, for such purposes as selective adsorption, selective cracking and hydrocracking, selective operation of hydrogenation and/or dehydrogenation, selective chemical transformation, and the like, of a controlled port size different from and smaller than that normally associated with the crystalline structure of the aluminosilicate material. One aspect of this is the provision of aluminosilicate materials of the structural stability normally associated with materials of high Si/Al ratio and large port size, which materials have desired small port sizes. Another aspect is the provision of aluminosilicate materials useful as carriers of impregnant materials to provide a catalytic effect arising from the impregnant or from combination of the impregnant and aluminosilicate (which may be an ion-exchanged aluminosilicate) which materials have a controlled port size different from and smaller than the port size normally associated with the aluminosilicate material.

The various processes indicated above in which the aluminosilicate materials of this invention may be applied do not differ essentially in parameters such as temperature, pressure, sequence of operations, and the like, from those processes known to the art in which the usual aluminosilicate materials and ion-exchanged aluminosilicate materials are used.

We claim:
1. A catalyst composition prepared by:
    treating a crystalline aluminosilicate having pore sizes of the order of at least about 10 A.
    with a material capable of bonding essentially to the surface of the crystallite at locations adjacent the entrance ports to the interior structure thereof
    in amounts sufficient to reduce the said entrance ports to dimensions of the order of not over about 8 A.
    without substantial change in the interior structure of said crystalline aluminosilicate.
2. The method of claim 1 in which a second catalytic material effective for the conversion of hydrocarbons has been introduced to the interior of the crystalline aluminosilicate prior to treatment to reduce the entrance port size thereof.
3. The method of claim 1 in which the crystalline aluminosilicate has been treated with a cationic material to increase its effectiveness for hydrocarbon conversion prior to treatment to reduce the entrance port size of the aluminosilicate.
4. That method of treating a crystalline aluminosilicate of large pore size of the order of at least about 10 A. to convert it to one capable of selectively converting only hydrocarbons of small molecular dimensions which comprises:
    treating said crystalline aluminosilicate with a material capable of bonding essentially to the surface of the crystallite at locations adjacent the entrance ports to the interior structure of the crystallite in amounts sufficient to reduce the said entrance ports to dimensions of the order of not over about 8 A.
    without effecting substantial change in the interior structure of said crystalline aluminosilicate.
5. The method of claim 4 in which a second material effective for the catalytic conversion of hydrocarbons is introduced to the interior of the crystalline aluminosilicate prior to treatment to reduce the entrance port size of the aluminosilicate.

6. The method of claim 4 in which the crystalline aluminosilicate has been treated with a cationic material to increase its effectiveness for hydrocarbon conversion prior to treatment to reduce the entrance port size of the aluminosilicate.

References Cited

UNITED STATES PATENTS

| | | | |
|---|---|---|---|
| 2,493,896 | 1/1950 | Pardee et al. | 208—120 |
| 2,971,904 | 2/1961 | Gladrow et al. | 208—135 |
| 2,982,719 | 5/1961 | Gilbert et al. | 208—120 |
| 2,991,151 | 7/1961 | Breck et al. | 23—113 |
| 3,039,953 | 6/1962 | Eng | 208—26 |
| 3,140,253 | 7/1962 | Plank et al. | 208—120 |

DELBERT E. GANTZ, *Primary Examiner.*

A. RIMENS, *Assistant Examiner.*